United States Patent
Rhodes et al.

(10) Patent No.: US 7,097,231 B2
(45) Date of Patent: Aug. 29, 2006

(54) DOOR MODULE AND DOOR ASSEMBLY METHOD

(75) Inventors: Chris Rhodes, Orleans (FR); Sylvain Chonavel, Thury Harcourt (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 0 days.

(21) Appl. No.: 10/773,107

(22) Filed: Feb. 5, 2004

(65) Prior Publication Data

US 2004/0227375 A1 Nov. 18, 2004

(30) Foreign Application Priority Data

Feb. 14, 2003 (FR) .................................. 03 01821

(51) Int. Cl.
- *B60J 1/17* (2006.01)
- *B60J 5/04* (2006.01)
- *B60J 1/16* (2006.01)

(52) U.S. Cl. ............................... 296/146.7; 296/146.2; 296/146.5; 49/502

(58) Field of Classification Search ............. 296/146.1, 296/146.2, 146.5, 146.7, 146.16; 49/502
See application file for complete search history.

(56) References Cited

U.S. PATENT DOCUMENTS

| | | | |
|---|---|---|---|
| 4,845,894 A * | 7/1989 | Herringshaw et al. | 49/502 |
| 4,882,842 A * | 11/1989 | Basson et al. | 29/857 |
| 5,050,350 A | 9/1991 | Bertolini et al. | |
| 5,462,482 A * | 10/1995 | Grimes | 454/143 |
| 5,584,144 A * | 12/1996 | Hisano | 49/502 |
| 5,603,548 A * | 2/1997 | Gandhi et al. | 296/146.7 |
| 6,029,403 A * | 2/2000 | Bertolini et al. | 49/502 |
| 6,449,907 B1 * | 9/2002 | Nishikawa et al. | 49/502 |
| 6,594,955 B1 * | 7/2003 | Delire et al. | 49/502 |
| 6,615,546 B1 * | 9/2003 | Furuyama et al. | 49/502 |
| 6,698,140 B1 * | 3/2004 | Tatsumi et al. | 49/502 |
| 6,754,991 B1 * | 6/2004 | Tokui et al. | 49/502 |
| 6,823,628 B1 * | 11/2004 | Morrison et al. | 49/502 |
| 6,857,688 B1 * | 2/2005 | Morrison et al. | 296/146.7 |

FOREIGN PATENT DOCUMENTS

| | | |
|---|---|---|
| EP | 1043182 | 10/2000 |
| EP | 1197366 | 4/2002 |
| FR | 2826914 | 1/2003 |

OTHER PUBLICATIONS

European Search Report dated Jul. 8, 2003.

* cited by examiner

Primary Examiner—D. Glenn Dayoan
Assistant Examiner—Greg Blankenship
(74) Attorney, Agent, or Firm—Carlson, Gaskey & Olds

(57) ABSTRACT

A vehicle door module includes a door trim defining a plane and a window regulator rail separably fixed to the door trim. The rail is fastened to a door at a fastening point. A projecting line extends from the fastening point and perpendicular to the rail to intersects the plane outside the door trim A method for assembling the door module in a door includes introducing the window regulator rail into the shell of the vehicle door, fastening the fastening point to the shell, and separating the door trim from the rail. Access is not impeded by the door trim. The arrangement simplifies mounting of the window regulator to the door.

16 Claims, 2 Drawing Sheets

DOOR MODULE AND DOOR ASSEMBLY METHOD

REFERENCE TO RELATED APPLICATION

This application claims priority to French Patent Application FR 03 01821 filed on Feb. 14, 2003.

TECHNICAL FIELD

The present invention relates generally to a door module and a method of assembling the door module.

BACKGROUND OF THE INVENTION

European Patent application 1,043,182 discloses a door module including a door trim or inner lining panel on which elements, such as a window regulator, are mounted. The window regulator is mounted to allow sliding between the window regulator and the door trim. The door trim includes a hinged portion. When the door module is placed on a door, the hinged portion allows access for the assembly of the elements or for fixing operations.

There are several drawbacks to the door module of the prior art. For one, the hinged portion complicates the manufacture of the door trim. Additionally, the hinged portion reduces the visibility behind the door trim, increasing the difficulty of the fixing of the window regulator to the door.

There is therefore a need in the art for a door module that simplifies the mounting of the window regulator.

SUMMARY OF THE INVENTION

The invention is directed to a door module including a door trim defining a plane and a window regulator rail separately fixed to the door trim. The rail is fastened to a door at a fastening point. A projecting line extends from the fastening point and perpendicular to the rail and intersects the plane outside the door trim. The fastening point can be in an upper region of the rail. Alternately, the fastening point is in a region above and below the rail.

In one embodiment, the rail is fixed to the door trim by a clip. In another embodiment, the module includes a window regulator, and the rail is a guide rail.

Preferably, the door module further includes an electric window regulator control fixed to the door trim and connected to the window regulator by electric cabling. The door module can further include a lock separably fixed to the door trim and a handle for actuating the lock.

In one embodiment, the window regulator includes a second guide rail fixed to the door at a fastening point. A projecting line extends from the fastening point and perpendicular to the rail and intersects the plane outside the door trim.

The invention also relates to a method of assembling a door including the steps of providing of a door having an outer skin fixed to a shell and a door module as described above. The rail is introduced into the shell and fastened to the shell at the fastening point. The door trim is separated from the rail, and the door module is fixed to the shell.

According to one embodiment, the method further includes the step of fastening the rail to the shell at a second fastening point after the step of separation. In another embodiment, the steps of fixing the door trim and fastening the second fastening point occur simultaneously.

According to another embodiment, the door module further includes a window regulator having the rail as a guide rail and a window glass slide. The method further includes the step of mounting the window glass onto the slide.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawing that accompanies the detailed description can be briefly described as follows.

DETAILED DESCRIPTION OF PREFERRED EMBODIMENTS

The invention provides a door module including a door trim defining a plane P and a window regulator rail separately fixed to the door trim. The rail is fastened to a door at a fastening point. A projecting line extends from the fastening point and perpendicular to the rail intersects the plane outside the door trim at a point, ensuring the door trim does not hinder access to the fastening point. The module simplifies mounting of the window regulator onto the door.

Figure 1:
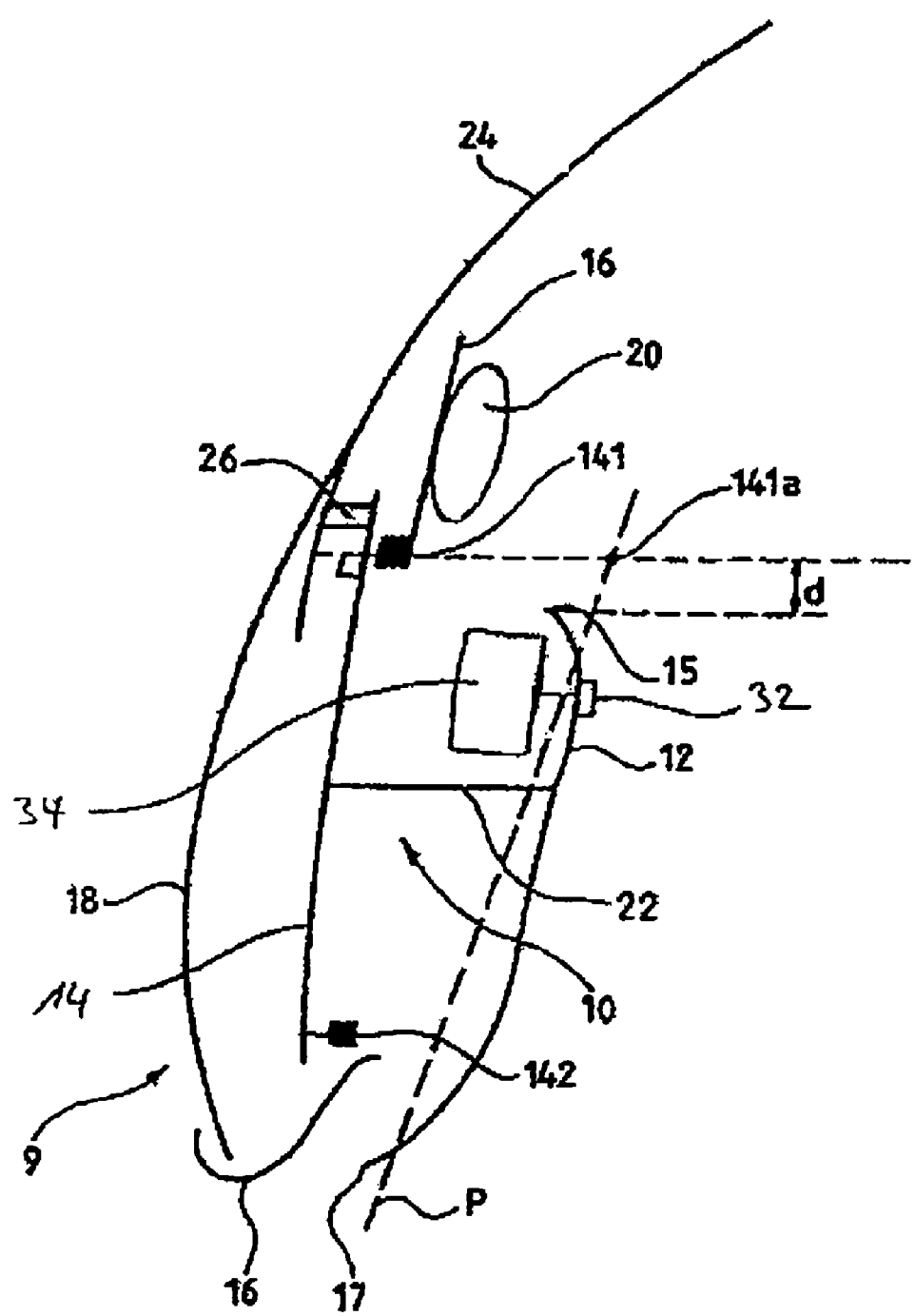
FIG. 1 schematically illustrates a door section including the door module according to one embodiment.

FIG. 1 illustrates a section of a vehicle door 9 including a door module 10 according to one embodiment. The module 10 includes a trim panel 12 defining a mid-plane P. The trim panel 12 can have any shape. The module 10 also includes a window regulator rail 14 separably fixed to the trim panel 12 by a connection 22. The rail 14 is fastened to a door 9 at a fastening point 141. A projecting line extends from the fastening point 141 and perpendicular to the rail 14 and intersects the plane P outside the door trim 12 at a point 141a. An offset d, parallel to the rail 14, is defined between the point 141a and the upper edge of the trim panel 12. The offset d allows access to the fastening point 141 from the side of the trim panel 12 not fixed to the rail 14. Preferably, the point 141a is delimited by the outer contour 15 of the trim panel 12.

The door 9 further includes an outer skin 18 fixed on a shell 16. The shell 16 receives a window glass 24 when lowered and also receives equipment elements, such as a window regulator. An upper part of the frame of the shell 16 includes an approximately horizontal reinforcement bar 20 that extends transverse to the window glass-guiding direction and provides reinforcement in the event of an accident.

The module 10 includes the rail 14 and the trim panel 12 to facilitate assembly of the door 9. The module 10 reduces the number of spare parts for assembling the door 9 and the number of part references. The module 10 also allows more practical transport of the parts once secured. The electrical cabling and mechanical cables (internal handle/lock connection), if appropriate, can also be secured prior to the assembly of the door 9, facilitating the cabling. The module 10 can support the window regulator rail 14, the lock, the window regulator, the window regulator control, a loudspeaker or any other vehicle equipment element.

The separable fixing between the rail 14 and the trim panel 12 is rigid, and the relative position of the rail 14 and the trim panel 12 remains approximately the same during manipulation of the module 10. The rail 14 is immobilized with respect to the trim panel 12, and the manipulation of one element leads to the displacement of the other. For example, the positioning of the rail 14 in the shell 16 of the door 9 can be accomplished by manipulating the trim panel 12. Thus, once the rail 14 is positioned in the door 9, it can be maintained in place by holding the trim panel 12.

Separable fixing means that the rail 14 and the trim panel 12 can move independently by breaking the rigid fixing. The fixing of the rail 14 and the trim panel 12 is only temporary. A wiring loom can link the two elements 12 and 14 so that the rail 14 and the trim panel 12 are not totally detached. Nevertheless, after separation, the relative position of the rail 14 and the trim panel 12 can be varied. The separation does not affect the structure of rail 14 and the trim panel 12.

The trim panel 12 allows assembly of the door 9 on the passenger compartment side. In one example, the trim panel 12 is fixed to the door 9 at the outer contour 15.

The window regulator rail 14 guides the window glass in the shell 16 of the door 9. The rail 14 can guide a slide fixed to the window glass or can directly guide the window glass by channels. The rail 14 is preferably fixed to a structural part of the door 9, such as the frame of the shell 16, to ensure the guiding of the window glass. The fastening point 141 can be a lug or a hole that receives a fastening member, such as a screw, or any zone of the rail 14 that allows fastening to the door 9 or to the shell 16 of the door 9.

Access to the equipment elements in the shell 16 of the door 9 is limited by the presence of the outer skin 18 of the door 9. Therefore, it is only possible to access the inside of the shell 16 from the side of the door 9 where the trim panel 12 is fixed. The module 10 allows access to the fastening point 141 of the rail 14 to the shell 16, and the trim panel 12 does not impede access to the fastening point 141. The fastening point 141 is situated, by way of example, in an upper region of the rail 14, and the upper outer contour 15 of the trim panel 12 is offset downward with respect to the point 141a. The fastening point 141 can also be in a lower region of the rail 14, the outer contour 17 below the trim 12 being offset upward with respect to the point (not shown). Preferably, the rail 14 includes fastening points 141, 142, at each end of the rail 14. By a simple construction of the trim panel 12, easy access to the fastening points 141, 142 of the rail 14 is possible.

The rail 14 is fixed to the door 9 under the reinforcement bar 20. The offset d is chosen to allow access to the fastening point 141 by an operator. The operator can pass a tool, and optionally a hand, to fasten the rail 14. Additionally, the module 10 allows the operator to hold the rail 14 in place in the shell 16 while supporting the trim panel 12 fixed to the rail 14. Once the rail 14 is fastened at the fastening point 141, the trim panel 12 can be separated from the rail 14 and fixed to the door 9.

Preferably, the fastening point 141 is in an upper region of the rail 14, allowing the upper region of the rail 14 to be fastened to hold the module 10 without tipping, which could lead to the module 10 falling from the door 9. The operator can separate the trim panel 12 from the rail 14 without concern about the module 10 falling.

In one example, the rail 14 is fixed to the trim panel 12 by a clip 22, which may be made of plastic. The clip 22 allows the rail 14 to be held rigidly to the trim panel 12 to simultaneously manipulate the two elements 12, 14. The clip 22 can be broken to separate the rail 14 from the trim panel 12 once the rail 14 is fastened to the shell 16. The clip 22 can be broken by a sharp movement of the trim panel 12 with respect to the rail 14 fastened to the door. The rail 14 and the trim panel 12 can also be separated by employing a cutting tool.

The module 10 can further include a window regulator to move a window glass 24, and the rail 14 is a guide rail. Thus, the whole window regulator can be mounted in advance on the module 10. The window glass 24 can slide between the reinforcement bar 20 and the outer skin 18, and the window regulator can have a cable and be driven by an electric motor. The motor is preferably mounted on the rail 14, and the separation of the rail 14 from the trim 12 does not affect the regulation of the window regulator.

Figure 2:
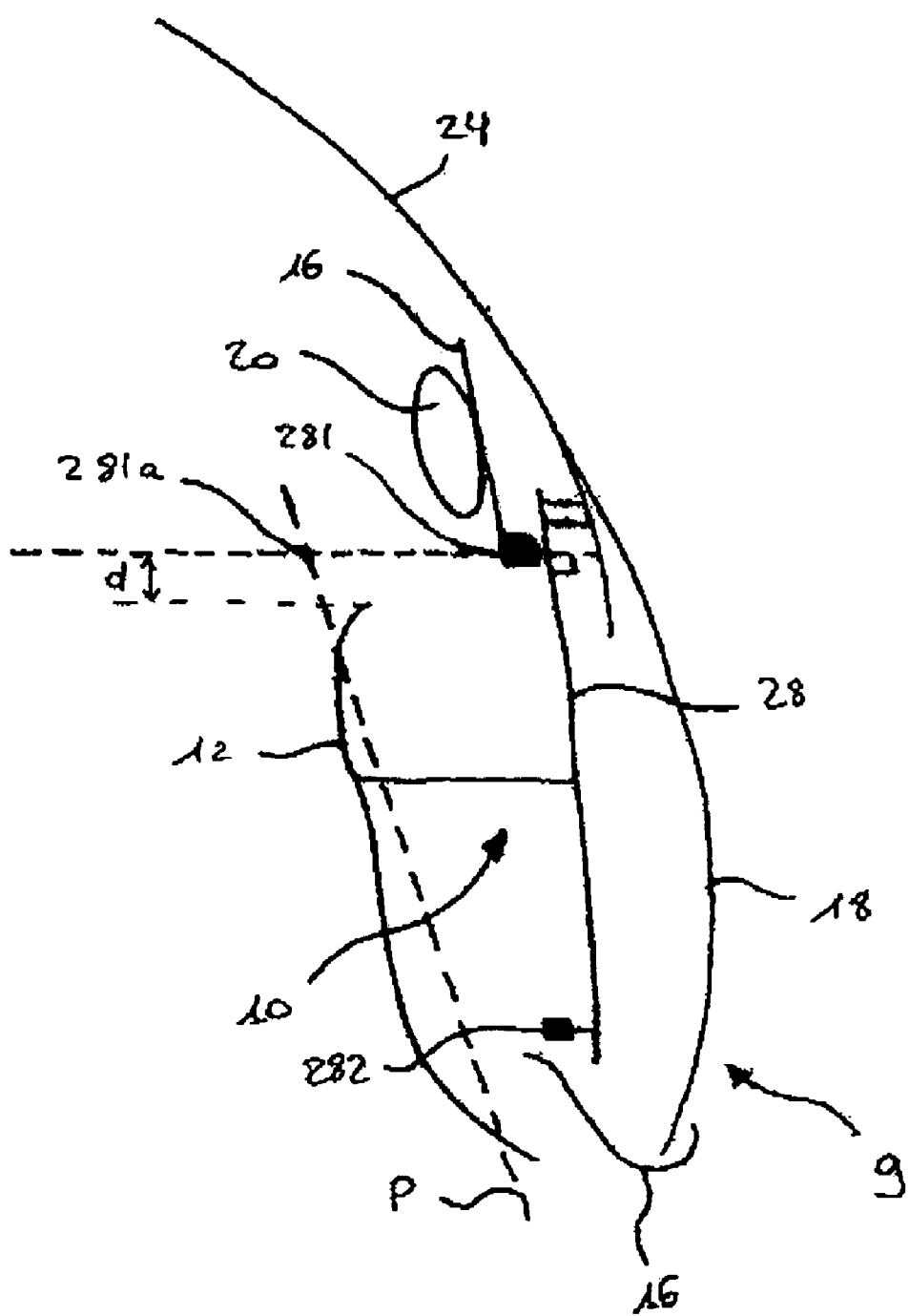
FIG. 2 schematically illustrates another door section including the door module.

The fastening point 141 does not impede movement of the slide or the window glass 24 and can be located on either side of movement of the slide. The fastening point 141 can also be on another face of the rail 14 than the slide and the slide operating cable redirection system. As shown in FIG. 2, the window regulator can include two rails 14 and 28, and the second rail 28 is fastened to the door at a fastening point 281. A projecting line extends from the fastening point 281 and a perpendicular to the rail 28 and intersects the plane P outside the door trim at a point 281a. Preferably, the fastening points 281 and 282 are in the same region of the rails 14 and 28, i.e., in the same upper or lower region of the rails 14 and 28. The offset d of the trim panel 12 with respect to the rails 14 allows the fastening of the fastening points 141 to the door 9 while the trim panel 12 and the rails 14 are not yet separated. Both the rails 14 can be fixed to the trim panel 12, or alternatively a single rail 14 is fixed to the trim panel 12 and the other rail 14 is fixed to the preceding rail.

The module 10 can further include other vehicle equipment elements, such as an electric window-regulator control, a lock 34, etc. The lock can be fixed by an intermediate part to the window-regulator rail 14 or to the trim panel 12, and the actuating handle 32 can be fixed to the trim panel 12. The module 10 can Further include electrical/mechanical cabling between the lock and the handle or between the window regulator and the control.

The lock can be separably fixed to the trim panel 12, allowing only the rail 14 to be separated when the door 9 is mounted. Preferably, for the lock is offset with respect to the trim panel 12 in the longitudinal direction of the vehicle, reducing the number of part references. Additionally, the module 10 allows for more practical transport of the parts once secured together.

The invention also relates to a method for assembling the door 9 including the steps of providing the door 9 having an outer skin 18 fixed to a shell 16. The shell 16 can also include a reinforcement bar 20. The outer skin 18 allows access to the inside of the shell 16 from one side of the shell 16. The method further includes providing the module 10 described above. The module 10 includes a rail 14 rigidly fixed to a trim panel 12. The module 10 can further include a window regulator including the rail 14 as a guide rail. The window regulator can include a cable and a slide 26 that moves the window glass 24. Also, the module 10 can include it lock 34.

The method further includes the steps of introducing the rail 14 into the shell 16. The top end of the rail 14 can be located between the reinforcement bar 20 and the outer skin 18. The connection between the rail 14 and the trim panel 12 is rigid, and the rail 14 can be introduced into the shell 16 by manipulating the trim panel 12. The space in the shell 16 or access to the shell 16 is limited, and it is more practical to manipulate the trim panel 12 outside the shell 16.

Generally, the rail 14 is fixed under the reinforcement bar 20, but the cable redirection system can be behind or below the reinforcement bar 20 according to the travel of the window glass (long, short travel). When the cable redirection system is positioned under the reinforcement bar 20, the rail 14 can be introduced horizontally. When a gear is behind the reinforcement bar 20, the module 10 is inclined to allow the rail 14 to pass under the module 10.

The method further includes the step of fastening or fixing the fastening point 141 to the shell 16. The fastening point 141 can be in an upper part or a lower part of the rail 14, and the trim panel 12 is offset respectively towards the top or the bottom of the door 9. During this step, the fastening point 141 contacts the shell 16 of the door 9. Space or access to the shell 16 to hold the rail 14 in the shell 16 is limited, and the immobilization and holding of the fastening point 141 in the shell 16 are facilitated by manipulating the trim panel 12.

The intersection point 141a of the projecting line extending from the fastening point 141 and perpendicular to the rail 14 and the plane P is outside the trim panel 12 facilitating the fastening step. The operator situated on the side of the trim panel 12, opposite the side facing the shell 16 can carry out this step without working blind and without being troubled by the lack of space. Preferably, when the fastening point 141 is in the upper region of the rail 14, the trim panel 12 is then lowered, clearing access to the fastening point 141. The offset d is chosen as a function of the tool used and to allow the introduction of the tool into the shell 16 perpendicularly to the rail 14. The offset d between the fastening point 141 and the upper outer contour 15 of the trim panel 12 creates a "cone," with the fastening point 141 as its vertex and the offset d as its radius, giving freedom of access to the fastening point 141. The fastening step is carried out by screwing or riveting the rail 14 to the shell 16 at the fastening point 141, securing the module 10 to the door 9.

The method further includes the step of separating the trim panel 12 from the rail 14. This step can be carried out by using a tool. Preferably, this step is carried out by sharp movement of the trim panel 12 with respect to the rail 14, allowing for rapid separation without the use of an additional tool. By employing a sharp movement of the trim panel 12, it is possible to work more quickly without having to look behind the trim panel 12 to reach the connection 22. After this step, the trim panel 12 is moveable independently of the rail 14. Alternately, the two elements 12, 14 are still connected to each other by electrical wiring or mechanical cables.

The method finally includes the step of fixing the module 10 to the shell 16. The rail 14 can be fastened to the shell 16 at a second point 142, and this step includes fastening the rail 14 to the trim panel 12 at the second point 142 and fixing the trim panel 12 to the door 9 or to the shell 16. The trim panel 12 is separated from the rail 14, and the trim panel 12 can be displaced to reveal the second fastening point 142 which is fastened to the shell 16. Then, the trim panel 12 can be displaced with respect to the door 9 to arrange it in its final position. The trim panel 12 can be fixed by gluing or screwing.

Preferably, the trim panel 12 and the second fastening point 142 are simultaneously fixed to the door 9 or to the shell 16. They can be fixed simultaneously by a screw, a clip, or a rivet, expediting the final fixing of the module 10.

Between the step of fastening the fastening point 141 and the step of separation, the method can also include the step of mounting a window glass 24. The window regulator can include a slide which is fixed to the window glass 24. The window glass can be introduced between the reinforcement bar 20 and the outer skin 18. The trim panel 12 is held by the rail 14, and the operator can have access to the shell 16 and to the slide fixed to the window glass 24. The offset d can be provided to allow access to the slide. The method can also include the step of fixing the lock.

Of course, the present invention is not limited to the embodiments described by way of example. Thus, during the separation step, the rigid connection 22 can be deformed without the trim panel 12 being separated from the rail 14. It suffices for the trim panel 12 to have enough freedom to be moved into its final position. Additionally, the mounting of the module 10 is not limited to mounting in a door 9, but can also be mounted in a rear quarter panel at the height of the rear passengers of the vehicle.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle door module comprising:
   a door trim defining a plane;
   a window regulator rail;
   a first fixation feature to fix the window regulator rail to the door trim, wherein the window regulator rail is separably fixed to the door trim by the first fixation feature; and
   a fastening point including a second fixation feature to fix the window regulator rail to a structural part of a door, wherein a projecting line extends from the fastening point and perpendicular to the window regulator rail to intersect the plane at a point outside the door trims, wherein the door trim and the structural part of the door are separate components.

2. The door module according to claim 1, wherein the first fixation feature is a clip.

3. The door module according to claim 1, further including a window regulator, and the window regulator rail is a guide rail.

4. The door module according to claim 3, further including an electric window regulator control fixed to the door trim and connected to the window regulator by electric cabling.

5. The door module according to claim 3, further including a second guide rail having a second fastening point to the door, wherein a second projecting line extends from the second fastening point and perpendicular to the second guide rail to intersect the plane at a second point outside the door trim.

6. The door module according to claim 4, further including a second guide rail having a second fastening point to the door, wherein a second projecting line extends from the second fastening point and perpendicular to the second guide rail to intersect the plane at a second point outside the door trim.

7. The door module according to claim 1, wherein the window regulator rail includes an upper region, and the fastening point is in the upper region.

8. The door module according to claim 7, wherein the window regulator rail includes an additional fastening point to the door and a lower region, and the additional fastening point is in the lower region.

9. The door module according to claim 1, further comprising a lock separably fixed to the door trim.

10. The door module according to claim 9, further including a handle for actuating the lock, wherein the handle is fixed to the door trim.

11. The door module according to claim 1, wherein the door trim includes an outer contour, and the projecting line intersects the plane at the point outside the door trim which is delimited by the outer contour.

12. A method of assembling a vehicle door module comprising steps of:
   a) providing a door having an outer skin fixed to a shell, the vehicle door module including a door trim defining a plane and a window regulator rail separably fixed to the door trim, wherein the window regulator rail has a fastening point to the door and a projecting line extends from the fastening point and perpendicular to the window regulator rail to intersect the plane at a point outside the door trim;
   b) introducing the window regulator rail into the shell;
   c) fastening the fastening point to the shell;
   d) separating the door trim from the window regulator rail; and
   e) fixing the vehicle door module to the shell.

13. The method according to claim 12, wherein the window regulator rail further includes a second fastening point for fastening to the shell, and wherein the method further includes a step of fastening the second fastening point to the shell after the step of separating the door trim from the window regulator rail.

14. The method according to claim 13, wherein the step of fixing the vehicle door module to the shell and the step of fastening the second fastening point to the shell occur simultaneously.

15. The method according to claim 12, further including a step of mounting a window glass onto a window glass slide.

16. The method according to claim 12, wherein the step of separating the door trim from the window regulator rail includes breaking a connection between the window regulator rail and the door trim.

* * * * *

UNITED STATES PATENT AND TRADEMARK OFFICE
CERTIFICATE OF CORRECTION

| | | |
|---|---|---|
| PATENT NO. | : 7,097,231 B2 | Page 1 of 1 |
| APPLICATION NO. | : 10/773107 | |
| DATED | : August 29, 2006 | |
| INVENTOR(S) | : Rhodes et al. | |

It is certified that error appears in the above-identified patent and that said Letters Patent is hereby corrected as shown below:

Claim 1, Column 6, line 36: "trims" should be --trim--

Signed and Sealed this

Fifth Day of December, 2006

JON W. DUDAS
*Director of the United States Patent and Trademark Office*